United States Patent
Pena Varon (10) Patent No.: US 8,980,089 B2
(45) Date of Patent: Mar. 17, 2015

(54) HIGH-RATE ANAEROBIC POOL BIOREACTOR

(75) Inventor: Miguel Ricardo Pena Varon, Santiago de Cali (CO)

(73) Assignee: Universidad del Valle, Santiago de Cali (CO)

( * ) Notice: Subject to any disclaimer, the term of this patent is extended or adjusted under 35 U.S.C. 154(b) by 630 days.

(21) Appl. No.: 13/131,341

(22) PCT Filed: Dec. 1, 2009

(86) PCT No.: PCT/IB2009/055447
§ 371 (c)(1),
(2), (4) Date: Jul. 28, 2011

(87) PCT Pub. No.: WO2010/064195
PCT Pub. Date: Jun. 10, 2010

(65) Prior Publication Data
US 2011/0272347 A1  Nov. 10, 2011

(30) Foreign Application Priority Data

Dec. 2, 2008 (CO) ..................................... 8 128172

(51) Int. Cl.
*C02F 3/28* (2006.01)
(52) U.S. Cl.
CPC ................. *C02F 3/28* (2013.01); *Y02E 50/343* (2013.01); *C02F 3/2866* (2013.01); *C02F 2301/022* (2013.01)
USPC .......................................... 210/603; 210/615
(58) Field of Classification Search
CPC .... C02F 3/28; C02F 3/2866; C02F 2301/022; Y02E 50/343
USPC .................. 210/603, 615–617, 252, 259, 260
See application file for complete search history.

(56) References Cited

U.S. PATENT DOCUMENTS

| 4,209,388 A | 6/1980 | DeFraites |
| 4,267,038 A | 5/1981 | Thompson |
| 5,447,850 A | 9/1995 | McCann |
| 5,744,041 A | 4/1998 | Grove |
| 5,861,095 A * | 1/1999 | Vogel et al. .................. 210/605 |

(Continued)

FOREIGN PATENT DOCUMENTS

DE   2904449 A1 * 8/1979

OTHER PUBLICATIONS

Machine-generated English translation of DE 2904449. Generated on Oct. 2, 2013.*
Mara, D.D., Alabaster, G.P., Pearson, H.W. and Mills, S.W. Waste Stabilisation Ponds: A Design Manual for Eastern Africa. Lagoon Technology International. Leeds, England, 1992.

(Continued)

*Primary Examiner* — Fred Prince
(74) *Attorney, Agent, or Firm* — Maryellen Feehery Hank; Reed Smith LLP (57) ABSTRACT

The present application relates to a high-rate anaerobic pool bioreactor ("BLAAT") as an improved processing unit for treating biodegradable wastewater, which allows the conversion of a low-performance rate traditional system, such as the anaerobic pool, into an efficient, compact system that enables clean energy to be recovered in the from of biogas. The application also describes a process for the anaerobic treatment of wastewater that uses said bioreactor, which optimizes the processes of mixing and contact between the biomass and the substrate and presents a novel process for separating out the biomass by means of improved sedimentation in horizontal laminar flow.

20 Claims, 4 Drawing Sheets

(56) References Cited

U.S. PATENT DOCUMENTS

| | | | |
|---|---|---|---|
| 6,592,751 B2* | 7/2003 | Haridas | 210/97 |
| 2007/0251880 A1* | 11/2007 | Herding et al. | 210/603 |
| 2009/0050560 A1* | 2/2009 | Dos Santos Alves et al. | 210/608 |

OTHER PUBLICATIONS

PROSAB. Domestic Wastewater Treatment by Anaerobic Processes and Controlled Disposal on Soil. J.R. Campos (ed.), PROSAB, Rio de Janeiro, Brazil, 1999.

* cited by examiner

Plant View

FIGURE 4(a)

A-A' View

FIGURE 4(b)

HIGH-RATE ANAEROBIC POOL BIOREACTOR

RELATED APPLICATIONS

This application is the United States National Stage of International Application No. PCT/IB2009/055447, filed Dec. 1, 2009, which was published as International Publication No. WO 2010/064195, and which claims benefit of Columbian Patent Application No. 8 128172 filed Dec. 2, 2008. Both applications are incorporated by reference in their entirety herewith.

FIELD OF THE INVENTION

The current invention is related with a bioreactor for high-rate anaerobic ponds (BHRAP) as an improved process unit for the treatment of residual biodegradable waters. It has four main components that characterize its design, construction, and operation. Herein, we will also relate to an anaerobic treatment process of residual waters that employs said bioreactor.

BACKGROUND OF THE INVENTION

In recent years, a considerable number of treatment systems have been developed for the purification of residual waters. Most of these systems require sophisticated and costly equipment to guarantee the satisfactory operation of the procedure.

Also, the impact of organic wastes dumped into a water stream can be measured through the dissolved oxygen, along with the nitrogen-ammonium, chemical oxygen demand (COD) and biological oxygen demand (BOD). In the aerobic treatment of residual waters, i.e., the treatment in which there is a strong increase in oxygen supply via irrigation of solid surfaces, by agitation or simultaneous agitation and aeration, to assure that growth of the microorganisms that will degrade the organic matter contained in the waste water and their activity grow proportionally to the rate of aeration. Aerobic digestion is a bacterial process in which bacteria consume organic matter and convert it to carbon dioxide in the presence of oxygen. Once there is a lack of organic matter, the bacteria die and are used as aliment by other bacteria; the reduction of solids also occurs in this phase and because aerobic digestion happens much faster, the capital costs of this process can be much lower depending on the scale of the project.

However, the exploitation costs are much higher for aerobic digestion given the energetic costs necessary to add oxygen to the process.

Conversely, anaerobic treatment is a bacterial process carried out in the absence of oxygen. Anaerobic digestion generates biogas, which contains a high proportion of methane that can be used fuel. Generating this fuel is a dominating advantage for this anaerobic process. Its disadvantage is the time needed for the process, which in some instances may take several days, but nevertheless, the capital costs may be than those for the aerobic treatment.

When residual waters with a reasonably high organic load are kept in the pond for several days, anaerobic sediment is accumulated at the base of the pond. In an uncovered pond, the activity of anaerobic digestion is conducted at the base or bottom of the pond, while the activity near the surface tends to be aerobic facultative. These ponds may be shut to air with a floating cover to improve the activity of anaerobic digestion through excluding air, permitting the collection of biogas fuel, and reducing the effect of the odor coming from the anaerobic activity. Generally, these ponds may take residual waters from $BOD_5$ values between 400 and 5000 g/m³ with time of retention between 4 and 7 days. The anaerobic process is mostly self-propelled and the only initial mechanical action required is that of supplying the pond with residual waters and forcing its exit toward a drain by overflow.

The U.S. Pat. No. 4,209,388 document describes a method for residual water treatment that includes a first stage in which the body of residual water is introduced into a reservoir outfitted with an air supply that contains algae for the decomposition of organic matter, then the residual water is transferred to a second reservoir where there are no nutrients or solar light, as a consequence of the latter the algae die and sediment. The residual water is thereafter transferred to a third reservoir to separate the water from the sedimented algae.

The U.S. Pat. No. 4,267,038 document presents a system of residual water purification, which includes the step of elimination of solids like sludge, the digestion of said sludge, and the subsequent remixing with residual water, then an anaerobic stage is applied where bacterial oxidation of organic wastes takes place. The next steps include the stabilization of nutrients, nitrification, de-nitrification, and re-aeration, followed by the transference of the residual waters from the anaerobic tanks to one or more tanks containing algae or aerobic bacteria. The treated residual water is sent to multiple tanks including the recycling of the flow current to the aerobic or anaerobic tanks indicated previously, concomitantly with the separation of the algae used.

U.S. Pat. No. 5,447,850 presents a method to obtain methane from the treatment of residual waters. The method includes the use of aerobic and anaerobic microorganisms, which are inoculated in the residual water, the flow current is fermented with said organisms and the methane produced is conveniently removed.

U.S. Pat. No. 5,744,041 reveals a method for reducing $BOD_5$ in waste material that includes a high concentration of organic wastes. The method includes the steps to obtain two fractions of the residual water in a liquid fraction that includes water and waste organic matter, thereafter a portion of said waste organic matter anaerobically digested by microorganisms present in the wastes. Then comes the removal of a portion of the liquid fraction that has a reduced $BOD_5$ in relation to the $BOD_5$ from waste material; said portion that has been removed is then mixed with aerobic microorganisms and air is injected. A portion of the waste material that has been digested by aerobic microorganisms is allowed to form liquor that includes water and suspended solids. Afterwards, a portion of the suspended solids is sedimented, permitting the formation of clarified liquor with a reduced $BOD_5$ with respect to the $BOD_5$ of the liquor. The clarified liquor is subjected to bacterial treatment to obtain a permeate with a reduced $BOD_5$ with respect to the clarified liquid. As a final stage, at least a portion of the permeate is discharged or reused.

In spite of the existence of the previously discussed, there is still a need to furnish a reactor and a process to carry out an anaerobic treatment in residual waters, which provides an efficient solution in aspects related to the optimization of mix processes between the biomass and the substrate, the devices employed for the retention of the biomass, and the separation and recovery of such. With the solution proposed by the current invention, the conversion is achieved from a low-rate traditional system like the conventional anaerobic pond to a more compact and efficient system that additionally permits recovery of clean energy in the form of biogas. An important characteristic maintained in the high-rate bioreactor, HRAPB, is its simple operation and maintenance, which are

BRIEF DESCRIPTION OF THE DRAWINGS

FIG. 4 (a and b) represent the Bioreactor. Overhead view is 4(a) and side view is 4(b).

OBJECTS OF THE INVENTION

The object of the invention is related to a high-rate anaerobic pond bioreactor (HRAPB) as an improved process unit for the treatment of biodegradable residual waters, which permits converting a low-rate traditional system like the anaerobic pond into a compact and efficient system that permits recovery of clean energy in the form of biogas; also furnished is a process for anaerobic treatment of residual waters, which employs said bioreactor.

Additionally, another object of the current invention is the optimization of the mix and contact processes between the biomass and the substrate to increase the conversion performance of the process.

Another object of the current invention is the implementation of a system of retention of the active biomass for the bioreactor to diminish its operational losses over time.

Particularly, another object of the current invention is to provide a process of biomass separation through improved sedimentation in horizontal laminar flow.

DETAILED DESCRIPTION OF THE INVENTION

Figure 4A:
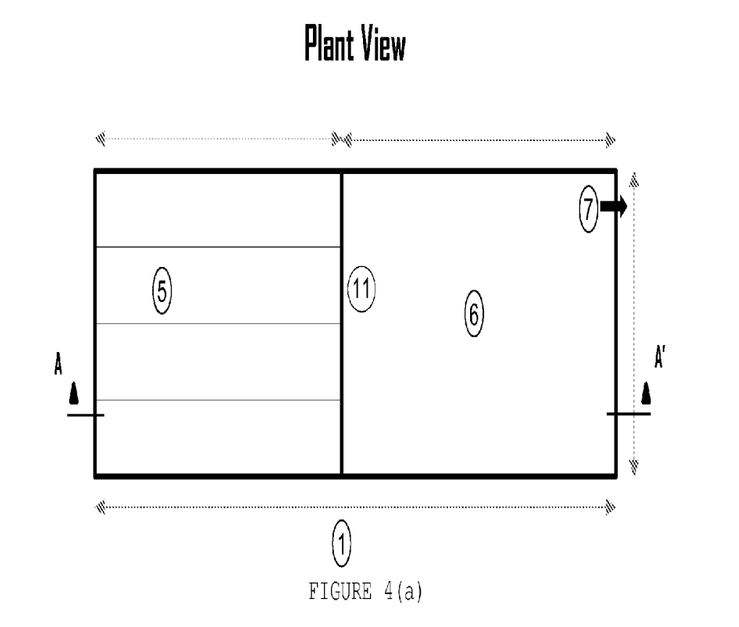
Figure 4B:
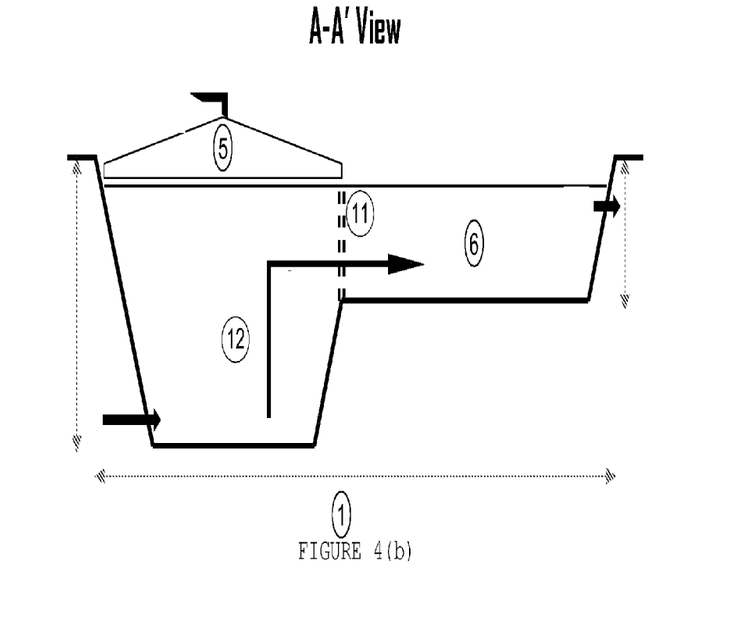

The high-rate anaerobic pond bioreactor (HRAPB) corresponds to an optimization of the conventional anaerobic pond. Through the current invention an increase is obtained in the treatment efficiency of biodegradable residual waters, measurement established as the percentage of biodegradable organic matter eliminated from the liquid phase entering the bioreactor per unit of time. Through this manner, a cleaner liquid effluent is obtained at the output of the HRAPB bioreactor, but also because of the active retention of the biomass, stabilization is accomplished of the bio-solids, thus reaching what is known as advanced primary treatment of residual water and the bio-solid produced in the HRAPB bioreactor. The latter is a typical characteristic of high-rate anaerobic reactors; improvement is reached with the solution provided with the HRAPB reactor is the conversion from a low-rate traditional system like the conventional anaerobic pond to a more compact and efficient system that additionally permits recovery of clean energy in the form of biogas (i.e., Methane, $CH_4$), The HRAPB bioreactor, as an improved process unit, has four main components that characterize its design, construction, and operation. The first component is a mix chamber (12), which is the structure that receives the raw residual water coming from the preliminary treatment. In this unit, through a vertical flow of the water, the necessary kinetic energy is guaranteed to produce sufficient mix and close contact between substrate and biomass. Thus, a very active biological bed is developed in this structure; such bed is characterized by particles or bio-floccules constituted by a diverse and active population of microorganisms from bacteria and archae domains. The dimensions or design of this chamber is a direct function of the type of residual water to be treated, the quantity of such, and the environmental temperature of the treatment zone. The depth of this chamber can vary between 4 and 6 m, and its volume can be calculated with volumetric organic loads that range between 0.8-1.5 Kg BOD5 m-3 d-1.

The second component is a transition zone (11) between the mix chamber and the sedimentation zone. Said zone is located directly afterward and on the upper part of the mix chamber. It is constituted by semi-permeable barriers, which permit changing the gradual direction of the fluid coming in vertical direction and upon crossing the permeable barriers, changes its direction to horizontal. Said barriers also offer a means of support for adhered biomass growth, which aside from furnishing additional treatment to the water exiting the mix chamber, also permits intercepting the particles or bio-floccules trying to escape the mix chamber, returning them to active reaction zone. The combined action of the mix chamber and the transition zone is constituted in the active mechanism of biomass retention of a HRAPB bioreactor, and this is what defines its characteristic as a high-rate reactor known in the state of the technique.

The third component is a biogas collection structure (5) found ahead and in the upper part of the transition zone. This structure that gathers the biogas produced in the mix chamber is projected in modular form or through compartments, whose size and quantity depend on the surface area of the mix chamber of the HRAPB unit. Diverse geometric shapes can be used for such; these include domes, spherical or elliptic caps, or pyramid or conic bells. The materials used for this structure are also diverse but these should be corrosion resistant and preferably light for the removal, maintenance, cleaning, and adequate repair of the respective collection bells. Said collecting structure as a component of the HRAPB bioreactor is fundamental for the adequate management of the possible greenhouse gases from the anaerobic biological degradation of organic matter. The design, construction, and adequate operation of this component in a HRAPB, gives this technology an ecological and innovative character, and turns into an alternative that contributes to the mitigation of climate change via improved treatment of liquid wastes of anthropic origin.

The fourth component of the HRAPB unit is an uncovered sedimentation zone (6). Once the water flows horizontally through the transition zone and through the semi-permeable membranes, it continues in the same flow direction along the sedimentation zone. This zone is characterized by low depth varying between 1.0 and 1.5 m; the water has horizontal velocities in orders of magnitude of $1.0 \times 10^{-2}$ m·s$^{-1}$. Due to this, a laminar flow regime is produced characterized by very low velocities and in a horizontal sense, which allows for improved sedimentation. This is also the most notable difference of a HRAPB reactor in comparison with other more traditional high-rate anaerobic systems like the UASB or RAFP reactors. This zone of the bioreactor is not covered because vast majority of the biogas has already been recovered in the collector structure for said purpose.

There are other complementary components that guarantee the operation of the HRAPB bioreactor; among others, there are the devices of input and distribution of residual water, the device to purge bio-solids, the beds for bio-solid drying, bio-filters for purifying the biogas collected, and the system for combustion or exploitation of the biogas. Each of these components is designed and constructed in function of the amount and quality of the residual water to be treated in the HRAPB. Likewise, the construction materials for these components are specified in function of the corrosiveness of the water and of the biogas generated in the mix chamber.

The treatment process of residual waters in the HRAPB bioreactor reaches efficiency of elimination of organic matter in the liquid phase in the order of 70±5%, measured as $BOD_5$. For solid matter found in the entering residual water, the HRAPB unit can reach elimination in the order of 75±5%, measured as the separation of total suspension solids (TSS). The collection and treatment of the biogas generated can reach a $CH_4$ recovery in the order of 80%. For the bio-solids, the production is low requiring only one evacuation of this material per month, depending on the contents of the organic matter present in the raw water.

The following experiments were developed to evaluate the hydrodynamic behavior (Experiment 1) and the performance of the process (Experiment 2) in the reactor of the current invention as compared to conventional reactors. The experimental reactors received residual water previously treated to remove thick solids and fats. The arrangement of the entry and exit pipes and the geometric shape of the reactors were designed according to recommendations from technical literature (Mara, D. D., Alabaster, G. P., Pearson, H. W. and Mills, S. W. *Waste Stabilisation Ponds: A Design Manual for Eastern Africa*. Lagoon Technology International. Leeds, England, 1992; PROSAB. *Domestic Wastewater Treatment by Anaerobic Processes and Controlled Disposal on Soil*. J. R. Campos (ed.), PROSAB, Rio de Janeiro, Brazil, 1999).

EXAMPLE 1

Experiment 1 evaluated a horizontal baffle anaerobic pond (HBAP) reactor, an HRAPB reactor of the invention with a built-in mix pond (MPAP) and a conventional anaerobic pond (CAP) reactor. The HBAP reactor presents to baffles placed at L/3 and 2 L/3. A flow-free space (0.80 m wide×1.70 m high) was left at the end of each horizontal baffle to permit water flow at the turn points. The HRAPB reactor equipped with MPAP was outfitted with a water input at the bottom followed by vertical flow through a reaction chamber. The residual water was fed by a multiple manifold type distribution system. Hence, the density resulting at the feed points (surface area of 8.8 m²) was 2.9 m²/point of entry. Once the residual water flows through the reaction chamber and is mixed with the biomass in the HRAPB reactor with MPAP, it travels horizontally through an undisturbed sedimentation zone toward the exit. The transition zone between the mix chamber and the sedimentation zone was elaborated with an arrangement of four permeable screens constituted by synthetic high-density polyethylene nets placed in the following configuration: the first and second screens have a mesh with 25-mm diameter hexagonal holes; while, the third and fourth screens have a mesh with 19-mm diameter hexagonal holes. The experiment was statistically designed with a comparative two-factor experiment, where the factors varied were the rate of hydraulic load (1.0, 1.2, 1.5, and 2.0 l/s) and the mix device inside the pond (HBAP, HRAPB with MPAP and CAP).

To conduct dispersion studies, a tracing solution was used for each combination of mix device and flow rate. The concentration of the tracer in the effluent was monitored during the sampling for a period equal to three times the theoretical hydraulic retention time (HRT). A tracer pulse (1 L solution containing 261 g LiCl [42.47 g $Li^+$]) was applied to the input flow of each anaerobic reactor, assuring that the point of application were the same for each test.

The LiCl solution was prepared the day before the test run to allow total cool down of such due to its exothermal behavior. A total of 60 samples per reactor effluent per test run were obtained to elaborate the resistance time distribution (RTD) curves, based on the tracer experimental curves. Control samples of untreated residual waters and sludge from the reactors were taken to establish the initial or bottom concentration of $Li^+$ and the adsorption of such on the bio-solids. The $Li^+$ concentrations were determined by atomic absorption in a Perkin Elmer S100PC spectrophotometer, method of air-acetylene flame at 670.80 nm with a detection limit of ±0.01 mg/l.

Each reactor was sown with a content of bio-solids equivalent to 5% of its total volume. The samples from untreated residual waters and from the effluents were taken daily from 07:00 h to 19:00 h during the test runs of dispersion studies. According to the experimental design, 21 COD determinations were carried out along with 12 from TSS and 12 from sedimentable solids in the input flow and the effluent per run, additional to the determination for temperature and pH.

TABLE 1

Summary of operational variables obtained from the different reactors

| HBAP | | | HRAPB with MPAP | | | CAP | | |
|---|---|---|---|---|---|---|---|---|
| Qr (l/s) | $HRT_t$ (h) | $\lambda_v$ | Qr (l/s) | $HRT_t$ (h) | $\lambda_v$ | Qr (l/s) | $HRT_t$ (h) | $\lambda_v$ |
| 1.0 | 25 | 570 | 1.0 | 29 | 373 | 1.0 | 23 | 470 |
| 1.2 | 21 | 601 | 1.2 | 24 | 526 | 1.2 | 19 | 751 |
| 1.5 | 16 | 847 | 1.5 | 19 | 751 | 1.5 | 15 | 842 |
| 2.0 | 12 | 902 | 2.0 | 14 | 968 | 2.0 | 11 | 1232 |

Qr = Rate of flow applied to the reactor;
$\lambda_v$ = Volumetric organic load expressed in g COD/m³d;
$HRT_t$ = Theoretical hydraulic retention time.

TABLE 2

Summary of hydrodynamic parameters obtained from the different reactors

| HBAP | | | HRAPB with MPAP | | | CAP | | |
|---|---|---|---|---|---|---|---|---|
| $HRT_e$ (h) | $\sigma^2$ | $\Delta$ | $HRT_e$ (h) | $\sigma^2$ | $\Delta$ | $HRT_e$ (h) | $\Sigma^2$ | $\Delta$ |
| 22 | 0.4298 | 0.304 | 29 | 0.4005 | 0.273 | 23 | 0.5412 | 0.454 |
| 21 | 0.5047 | 0.398 | 24 | 0.4257 | 0.299 | 19 | 0.6446 | 0.672 |
| 13 | 0.4333 | 0.308 | 19 | 0.4352 | 0.309 | 15 | 0.6344 | 0.645 |
| 11 | 0.1263 | 0.334 | 14 | 0.4304 | 0.304 | 11 | 0.5294 | 0.435 |

$HRT_e$ = Theoretical hydraulic retention time;
$\sigma^2$ = Variance of the RTD curve;
$\delta$ = Number of dispersion

EXAMPLE 2

Experiment 2 evaluated the process performance for the HBAP, HRAPB reactor with MPAP and CAP in stationary state for 22 weeks with three different rates of hydraulic load according to the design presented in Table 3.

TABLE 3

Design of the experiment for the evaluation of process performance in stationary state for HBAP, HRAPB reactors with MPAP and CAP.

| Configuration of the reactor | Applied flow rates (l/s) | HRT (h) | Monitoring period (weeks) |
|---|---|---|---|
| HBAP | 1.0/1.3/2.0 | 24.6/18.9/12.3 | 6 |
| MPAP | 1.1/1.5/2.3 | 26.0/19.3/12.6 | 6 |
| CAP | 0.9/1.3/1.8 | 25.3/17.2/12.7 | 6 |

The response to each rate of applied hydraulic load was evaluated for six weeks in stationary state, which was previously established in a two-week period.

Combined 12-h samples were taken in untreated waters and in the effluents from the reactors once per week, on the same day each week. The flow data were recorded each hour in each input flow on the day of the sampling. The flow rates of the effluent were measured volumetrically once per week to check water loss by evaporation. Determinations were made on pH, temperature, REDOX potential, volatile fatty acids (VFA), $SO_4^{2-}$, alkalinity, filtered COD, total COD, TSS, suspended volatile solids (SVS), fecal coliforms, $E.$ $coli$, and helminth eggs. The samples of bio-solids were taken from the bottom of the reactor by using an electric peristaltic pump: Dayton-AC Gear 5K940D.

TABLE 4

Operational variables applied to the reactors during the operation in stationary state.

| HBAP | | | HRAPB with MPAP | | | CAP | | |
|---|---|---|---|---|---|---|---|---|
| Qr (l/s) | $HRT_t$ (h) | $\lambda_v$ | Qr (l/s) | $HRT_t$ (h) | $\lambda_v$ | Qr (l/s) | $HRT_t$ (h) | $\lambda_v$ |
| 1.0 | 24.5 | 584 | 1.0 | 26.0 | 551 | 1.0 | 25.3 | 566 |
| 1.3 | 18.2 | 791 | 1.3 | 19.0 | 758 | 1.3 | 17.9 | 800 |
| 2.0 | 12.3 | 1151 | 2.0 | 12.6 | 1124 | 2.0 | 12.6 | 1124 |

Qr = Flow rate applied to the reactor;
$\lambda_v$ = Volumetric organic load expressed in g COD/m$^{-3}$d$^{-1}$;
$HRT_t$ = Theoretical hydraulic retention time.

The $BOD_5$ ($\lambda v$) rate of volumetric organic load applied to each of the reactors at the last stage ($Q_r$=2.0 l/s) was 780, 762, and 762 g $BOD_5$/m$^{-3}$d$^{-1}$ for HBAP, MPAP, and AP, respectively.

Figure 1:
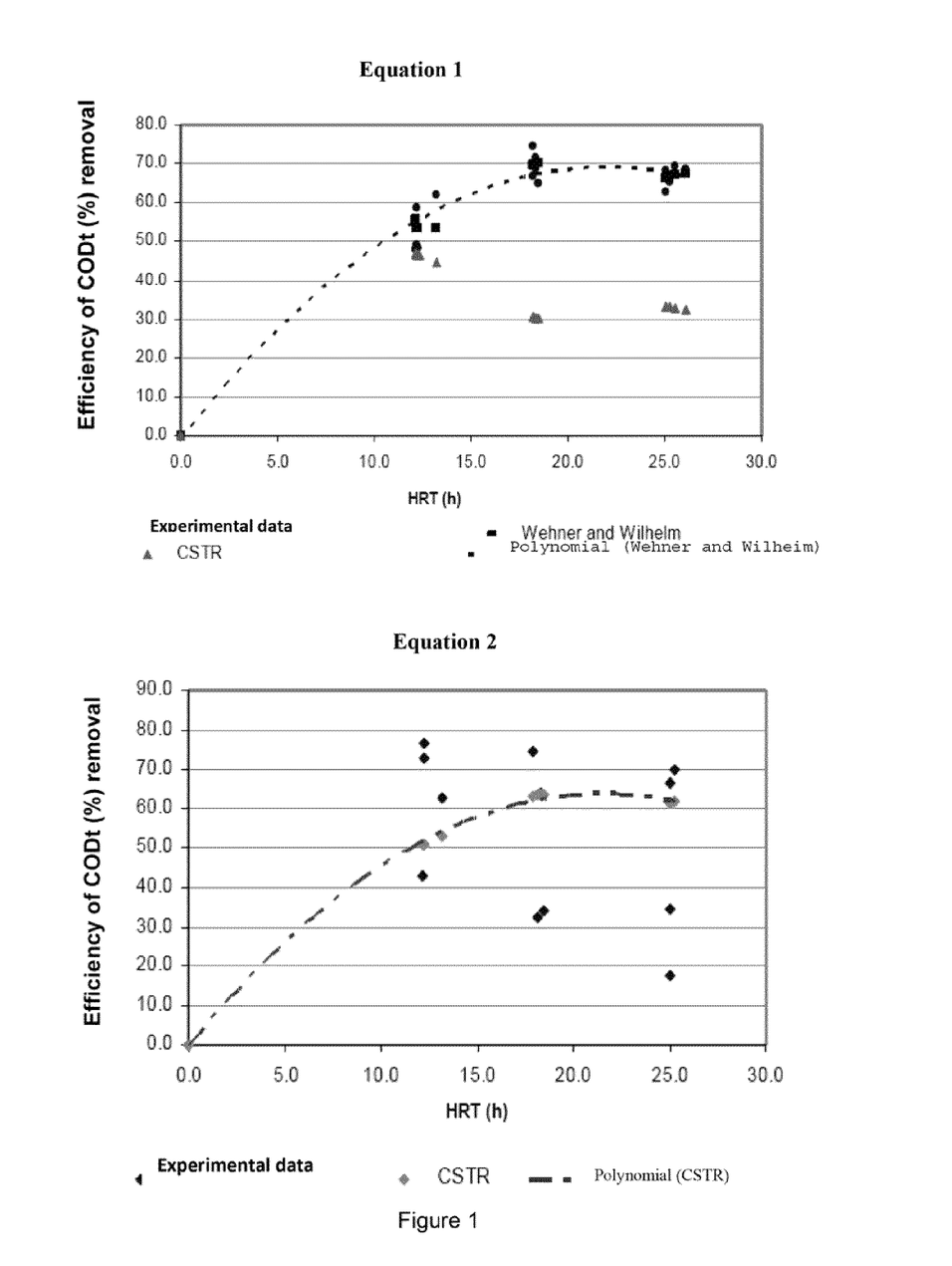
FIG. 1 represents the efficiency of $COD_t$ and $COD_f$ removal in function of HRT (h) for an anaerobic pond reactor with horizontal baffle (HBAP).
Figure 2:
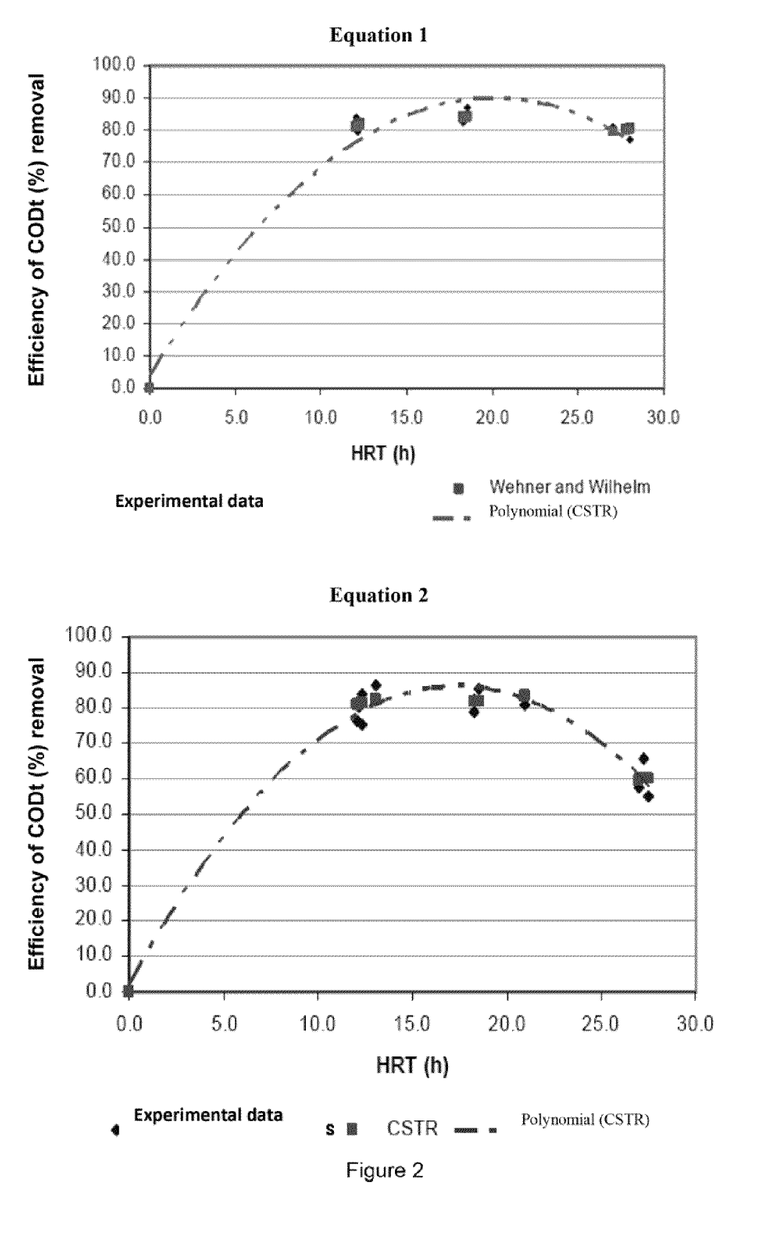
FIG. 2 represents the efficiency of $COD_t$ and $COD_f$ removal in function of HRT (h) for an HRAPB reactor of the invention with a built-in mix pond (MPAP).
Figure 3:
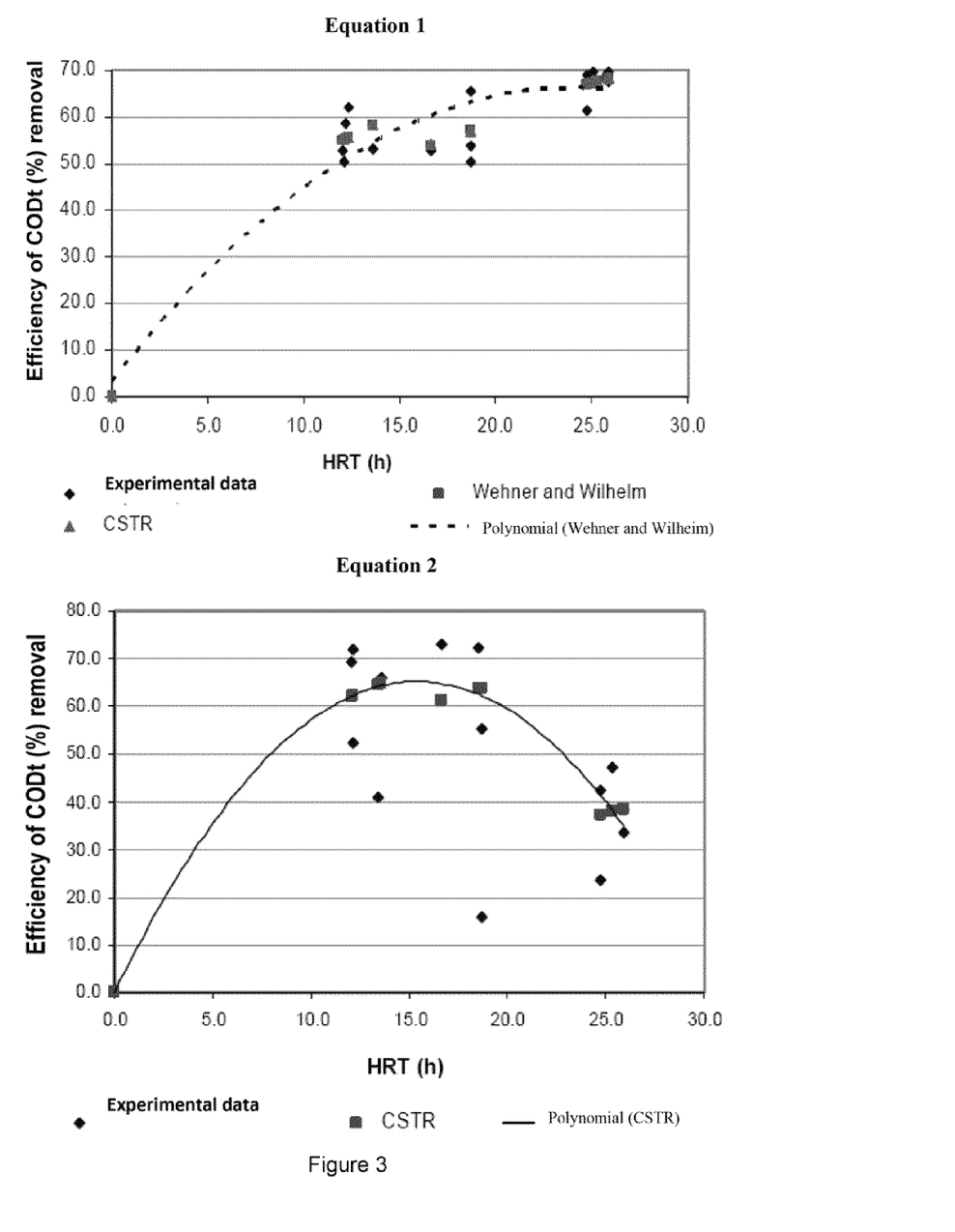
FIG. 3 represents the efficiency of $COD_t$ and $COD_f$ removal in function of HRT (h) for a conventional anaerobic pond reactor.

The efficiency of $COD_t$ and $COD_f$ elimination for each of the HBAP, HRAPB reactors with MPAP and CAP are presented in FIGS. 1, 2, and 3, respectively. The figures illustrate the percentage of experimental $COD_t$ and $COD_f$ elimination in function of the HRT (h) compared to the completely stirred tank reactor (CSTR) polynomial and the model by Wehner & Wilhelm.

FIGS. 1, 2, and 3 show the degree of dispersion of experimental data when compared to the theoretical lines of the CSTR and Wehner and Wilhelm dispersion models. The data dispersion is greater in the HBAP and CAP, especially in the elimination of $COD_f$; in contrast, the MPAP reactor shows a behavior close to that of the CSRT model for $COD_t$ and $COD_f$.

The results of evaluation of process performance in stationary state show that the greatest efficiency in $COD_t$ removal occurs in a MPAP reactor (77-79%), followed by the HBAP reactor (65-51%), and finally in the conventional reactor (67-49%).

Hydrodynamic improvement and the increase in the contact pattern along with greater retention of biomass explain the increase in efficiency in $COD_f$ removal found in the HRAPB reactor with MPAP (50-78%), compared to 41-44% with the HBAP reactor, and 44-53% with the conventional reactor (CAP).

Although the current invention has been described with the preferred realizations shown, it remains understood that the modifications and variations that conserve the spirit and reach of this invention are understood within the reach of the attached claims.

The invention claimed is:

1. A process to treat biodegradable residual waters using a bioreactor for high-rate anaerobic ponds, HRAPB, characterized because the process comprises the following stages:
    a) Placing into contact an entering residual water or substrate with an active biological bed within a mix chamber;
    b) Translating the residual water to a transition zone where the zone is capable of changing the direction of the incoming residual water to horizontal without substantially disturbing the water's kinetic energy; and
    c) Sedimenting the residual water from the transition zone in a sedimentation zone with low horizontal velocities and flow in laminar regime.

2. The process to treat biodegradable residual waters using the bioreactor for high-rate anaerobic ponds, HRAPB, according to claim 1 wherein said stage a) the flow of residual water is vertical, producing mix due to the kinetic energy of the fluid to place in close contact the residual water and the biomass.

3. The process to treat biodegradable residual waters using the bioreactor for high-rate anaerobic ponds, HRAPB, according to claim 1 wherein said stage a) the volumetric organic load is between 0.8 and 1.5 kg $BOD_5$ m$^{-3}$d$^{-1}$.

4. The process to treat biodegradable residual waters using the bioreactor for high-rate anaerobic ponds, HRAPB, according to claim 1 wherein said stage a) the input flow of residual water in vertical sense is gradually changed to horizontal flow.

5. The process to treat biodegradable residual waters using the bioreactor for high-rate anaerobic ponds, HRAPB, according to claim 1 wherein said stage b) interception is carried out of the flocculent biomass, which is returned to the mix zone in a).

6. The process to treat biodegradable residual waters using the bioreactor for high-rate anaerobic ponds, HRAPB, according to claim 1 wherein said stage c) the velocity of horizontal flow of residual water has a value close to $1.0 \times 10^{-2}$ m·s$^{-1}$.

7. The process to treat biodegradable residual waters using the bioreactor for high-rate anaerobic ponds, HRAPB, according to claim 1 wherein said stage c) there is laminar flow during the whole process, contributing to the high efficiency of the sedimentation operation.

8. The process to treat biodegradable residual waters using the bioreactor for high-rate anaerobic ponds, HRAPB, according to claim 1 wherein said elimination of organic matter in the liquid phase is between 65% and 75% measured as $BOD_5$.

9. The process to treat biodegradable residual waters using the bioreactor for high-rate anaerobic ponds, HRAPB, according to claim 1 wherein it eliminates between 70% and 80% of the solid suspended material present in incoming residual water, measured as TSS (total suspended solids).

10. The process to treat biodegradable residual waters using the bioreactor for high-rate anaerobic ponds, HRAPB, according to claim 1 wherein said recovery of methane gas from the process is in the order of 80%.

11. A process to treat biodegradable residual waters using a bioreactor for high-rate anaerobic ponds, HRAPB, characterized because the process comprises the following stages:
- a) placing into contact an entering residual water or substrate with an active biological bed within a mix chamber;
- b) translating the residual water to a transition zone where the zone is capable of changing the direction of the incoming residual water to horizontal without substantially disturbing the water's kinetic energy; and
- c) sedimenting the residual water from the transition zone in a sedimentation zone with low horizontal velocities and flow in laminar regime;

wherein the bioreactor comprises:
- A) said mix chamber, which is a structure to receive raw residual water;
- B) said transition zone between said mix chamber and said sedimentation zone;
- C) a structure to collect biogas, which follows in location and on the upper part of said transition zone; and
- D) said sedimentation zone.

12. The process to treat biodegradable residual waters using the bioreactor for high-rate anaerobic ponds, HRAPB, according to claim 11 wherein said stage a) the flow of residual water is vertical, producing mix due to the kinetic energy of the fluid to place in close contact the residual water and the biomass.

13. The process to treat biodegradable residual waters using the bioreactor for high-rate anaerobic ponds, HRAPB, according to claim 11 wherein said stage a) the volumetric organic load is between 0.8 and 1.5 kg $BOD_5$ $m^{-3}d^{-1}$.

14. The process to treat biodegradable residual waters using the bioreactor for high-rate anaerobic ponds, HRAPB, according to claim 11 wherein said stage a) the input flow of residual water in vertical sense is gradually changed to horizontal flow.

15. The process to treat biodegradable residual waters using the bioreactor for high-rate anaerobic ponds, HRAPB, according to claim 11 wherein said stage b) interception is carried out of the flocculent biomass, which is returned to the mix zone in a).

16. The process to treat biodegradable residual waters using the bioreactor for high-rate anaerobic ponds, HRAPB, according to claim 11 wherein said stage c) the velocity of horizontal flow of residual water has a value close to $1.0 \times 10^{-2}$ $m \cdot s^{-1}$.

17. The process to treat biodegradable residual waters using the bioreactor for high-rate anaerobic ponds, HRAPB, according to claim 11 wherein said stage c) there is laminar flow during the whole process, contributing to the high efficiency of the sedimentation operation.

18. The process to treat biodegradable residual waters using the bioreactor for high-rate anaerobic ponds, HRAPB, according to claim 11 wherein said elimination of organic matter in the liquid phase is between 65% and 75% measured as $BOD_5$.

19. The process to treat biodegradable residual waters using the bioreactor for high-rate anaerobic ponds, HRAPB, according to claim 11 wherein it eliminates between 70% and 80% of the solid suspended material present in incoming residual water, measured as TSS (total suspended solids).

20. The process to treat biodegradable residual waters using the bioreactor for high-rate anaerobic ponds, HRAPB, according to claim 11 wherein said recovery of methane gas from the process is in the order of 80%.

* * * * *